(12) United States Patent
Hogenmueller et al.

(10) Patent No.: US 9,606,537 B2
(45) Date of Patent: Mar. 28, 2017

(54) FAIL-SAFE EE ARCHITECTURE FOR AUTOMATED DRIVING

(71) Applicant: Robert Bosch GmbH, Stuttgart (DE)

(72) Inventors: Thomas Hogenmueller, Leonberg-Gebersheim (DE); Thorsten Huck, Murr (DE); Ulrich Kersken, Diekholzen (DE); Armin Ruehle, Weinstadt (DE); Heinz Tilsner, Stuttgart (DE); Carsten Gebauer, Boeblingen (DE); Tuelin Baysal, Ludwigsburg (DE); Bernd Mueller, Leonberg (DE); Volker Blaschke, Ludwigsburg (DE); Wolfgang Niem, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 26 days.

(21) Appl. No.: 14/880,510

(22) Filed: Oct. 12, 2015

(65) Prior Publication Data

US 2016/0103450 A1 Apr. 14, 2016

(30) Foreign Application Priority Data

Oct. 14, 2014 (DE) ........................ 10 2014 220 781

(51) Int. Cl.
*G05D 1/00* (2006.01)
*G05D 1/02* (2006.01)
*B60W 30/00* (2006.01)

(52) U.S. Cl.
CPC ........... *G05D 1/0077* (2013.01); *B60W 30/00* (2013.01); *G05D 2201/0213* (2013.01)

(58) Field of Classification Search
CPC ... G05D 1/0077; G05D 1/0088; G05D 1/0212
USPC ............................................................ 701/23
See application file for complete search history.

(56) References Cited

U.S. PATENT DOCUMENTS

| 5,086,499 A | * | 2/1992 | Mutone | G05B 9/03 714/10 |
| 5,107,425 A | * | 4/1992 | Donges | B60G 17/0185 701/29.2 |
| 6,122,572 A | * | 9/2000 | Yavnai | G05D 1/0088 342/13 |

(Continued)

FOREIGN PATENT DOCUMENTS

DE 10 2004 026 594 A1 3/2005

*Primary Examiner* — Tyler J Lee
(74) *Attorney, Agent, or Firm* — Maginot, Moore & Beck LLP

(57) ABSTRACT

A system with a first computer unit and with a second computer unit, wherein the first computer unit comprises a first interface to enable connection to at least one sensor and to at least one actuator, wherein the second computer unit comprises a second interface to enable connection to at least one sensor and to at least one actuator, wherein the first and the second computer units can be connected to each other by means of a further interface, wherein the actuator comprises an interface, wherein depending on the first or on the second operating state the interface determines whether a control command for a driving function is adopted by the first or the second computer unit, so that in the first operating state only the first computer unit can activate the actuator and in a second operating state only the second computer unit can activate the actuator.

19 Claims, 5 Drawing Sheets

(56) References Cited

U.S. PATENT DOCUMENTS

| | | | | |
|---|---|---|---|---|
| 7,877,179 B2* | 1/2011 | Katrak | ................ | B62D 5/008 |
| | | | | 180/402 |
| 7,878,461 B2* | 2/2011 | Hirvonen | ............... | B64C 13/04 |
| | | | | 244/223 |
| 8,112,191 B2* | 2/2012 | Kumar | .................. | B60L 7/18 |
| | | | | 701/22 |
| 2007/0027603 A1* | 2/2007 | Katrak | ............... | G06F 11/1608 |
| | | | | 701/70 |
| 2007/0164168 A1* | 7/2007 | Hirvonen | ............... | B64C 13/04 |
| | | | | 244/223 |
| 2008/0065294 A1* | 3/2008 | Katrak | ................ | B62D 5/008 |
| | | | | 701/43 |
| 2012/0265359 A1* | 10/2012 | Das | .................. | G06F 15/025 |
| | | | | 700/292 |
| 2014/0067164 A1* | 3/2014 | Papadopoulos | ....... | B64G 1/002 |
| | | | | 701/3 |
| 2014/0067192 A1* | 3/2014 | Yousuf | ............... | B60W 50/029 |
| | | | | 701/31.4 |
| 2015/0046932 A1* | 2/2015 | Kim | ...................... | G06F 9/54 |
| | | | | 719/313 |
| 2015/0274293 A1* | 10/2015 | Heusinger | ............ | B64C 15/00 |
| | | | | 701/36 |

\* cited by examiner

FAIL-SAFE EE ARCHITECTURE FOR AUTOMATED DRIVING

This application claims priority under 35 U.S.C. §119 to application no. DE 10 2014 220 781.9, filed on Oct. 14, 2014 in Germany, the disclosure of which is incorporated herein by reference in its entirety.

BACKGROUND

The disclosure concerns a system with two computer units and a method for performing a driving function.

In the prior art it is known to implement safety-relevant systems such that they change into a safe state in the event of a fault. The safe state is not functional as a rule and is characterized for example by a system that is not energized or that is de-energized. Furthermore, systems are known in which redundancy is maintained in relation to the computing power in case of a failure.

A fail-safe system maintains its operation even in the presence of a fault. Known architectures are:
  2 from 3 voting
  duo-duplex structure In principle the use of cold and hot redundancy is also known.

SUMMARY

The object of the disclosure is to provide a system for controlling an automation task in the vehicle.

An advantage of the described system and of the described method is that it is ensured that only one of the two computer units can activate an actuator. This is achieved by designing the first computer unit and/or the second computer unit and/or the actuator to determine whether the first or the second computer unit can effectively activate the actuator.

In one embodiment, in the case of correct operation of the first computer unit a first operating state is active and only the first computer unit can effectively activate the actuator, and wherein in the event of a malfunction of the first computer unit a second operating state is active, and only the second computer unit can activate the actuator.

In one embodiment the actuator comprises an interface, wherein the interface determines which of the two computer units can output a control command to the actuator. In this way it is ensured that only the computer unit that actually has the ability to output the control commands can also output the control commands to the actuator. In the case of error-free operation only the first computer unit is provided for that. If the first computer unit has a malfunction, the right to output a control command to the actuator can be passed to the second computer unit.

Said procedure gives in particular an advantage in the performance of automated driving functions by the system. Automatic driving functions are for example automatic spacing control, automatic speed control, automatic braking or automatic steering of the vehicle. Automated driving functions are characterized in that the system has the responsibility and the driver is not available as a fallback level if a fault occurs.

A further improvement in relation to failure safety is achieved according to one development by designing the second computer unit to carry out a test method. The test method is for example performed in a first operating state, in which the first computer unit is operational. The test method can include both testing of the second computer unit and also testing of the first computer unit.

A further improvement of the system is achieved by the test method concerning a communication between the second and the first computer units, which means that the second computer unit tests whether communications between the first and the second computer unit are operating correctly. For this for example test data can be exchanged between the computer units.

A further improvement of the system is achieved according to one development by the second computer unit checking its own correct operation using the test method. For this certain tasks performed by the second computer unit can be stored in a memory, wherein a correct outcome of the tasks is also stored in the memory and is compared by the second computer unit after processing the task.

In a further embodiment the system is switched from the first operating state into the second operating state if a malfunction of the first computer unit has been detected. The malfunction can for example have been checked and detected by the first computer unit itself using a suitable test method. In addition, however, the second computer unit can also have checked and detected a malfunction of the first computer unit using a test method.

A further improvement of the system is achieved that is designed according to a further embodiment of the actuator to control the actuator in a safety function or into a safety position if there is a malfunction of the first computer unit and/or the second computer unit. Using said measure it is possible, even in the event of a failure of the first and the second computer units, for the actuator itself to be able to control the actuator using a safety function, for example using a separate actuator controller or a separate electronic circuit. The safety function ensures that predetermined safety conditions are maintained.

In a further embodiment, two actuator controllers are provided, wherein the two actuator controllers work in conjunction with at least one actuator. In addition, each actuator controller comprises an interface to which the first and the second computer units are connected. Further redundancy for a failure of an actuator controller is achieved in this way.

In a further embodiment, the failure rate of the system is reduced by connecting the first computer unit and the second computer unit to separate electronic power supply systems. This ensures that in the event of a failure of a power supply system at least one of the two computer units continues to be supplied with electrical power. The two power supply systems can constitute sub units of the on board electronic system or completely separate power supply systems, which are for example supplied by the battery or the alternator.

A further improvement of the system is achieved according to one development by the first computer unit being designed to supply at least input data for a check of the correct operation of the second computer unit. As a result a further increase in safety is achieved, because the input data is not provided by the second computer unit, but independently of the second computer unit by the first computer unit. Thus a fault in the generation of the input data by a malfunction of the second computer unit can be excluded.

In a further embodiment the first computer unit is designed to transmit a computed control for a driving function to the second computer unit. In addition, the second computer unit is designed to perform the same calculation for the same control. Furthermore, the second computer unit is designed to compare the same computed result with the control transmitted by the first computer unit. A malfunction of the first and/or the second computer unit can be detected using the comparison.

A further improvement of the system is achieved according to one embodiment by at least two sensors being provided, which redundantly measure the same parameter. In addition, at least the first computer unit is connected to the first sensor and the second computer unit is connected to the second sensor. The measurement of the parameter can thus be matched and a malfunction of a sensor or a computer unit can be detected.

In a further embodiment, a plurality of redundant sensors can be provided, which at least partly measure the same parameter, wherein the first and the second computer units are connected to an overlapping set of the two sensors. In this way too a check of the parameters of the overlapping set or a check of the operation of the computer unit can be carried out at least for the sensors of the overlapping set by a comparison of the redundantly detected parameters or of the parameters determined by the computer units. If for example a malfunction is detected by the first and the second computer units with only one redundant pair of sensors, wherein a different pair of sensors provides correct measurement values, then a malfunction can be localized to the sensors. If however a check of a plurality of sensors of the pairs of sensors of the overlapping set by the first and the second computer units gives an indication of a malfunction, then this can indicate a malfunction of the first or the second computer unit.

In a further embodiment, the safety for a handover request of an automated driving function can be improved. For this a handover request for performing an automated driving function is passed from the HMI to the two computer units by means of separate interfaces. The two computer units are designed to indicate separately from each other a takeover of the driving function to the HMI. Furthermore, the HMI is designed to hand over the automated driving function to the first computer unit only if both computer units indicate that they are operating correctly and can perform the automated driving function.

A further improvement of the safety of the system is achieved according to one embodiment by the first computer unit signaling a takeover of the automated driving function to the HMI if the first computer unit assesses itself to be operational and also receives the information from the second computer unit that the second computer unit is also operational. In addition, the second computer unit sends a takeover of the driving function to the HMI if the second computer unit assesses itself to be operational and receives the information from the first computer unit that the first computer unit also assesses itself to be operational. In this way increased validation of actual operability of the first and the second computer units is achieved before the takeover of an automated driving function.

The driving function whose takeover is offered can for example be a steering function, an acceleration function or a braking function or even a combination of such functions.

A further improvement of the system is achieved according to one development by the performance of the driving function being returned to the first computer unit in a second operating state in which the second computer unit is carrying out the driving function if the first computer unit indicates that the first computer unit is operational again. A temporary failure of the first computer unit can be bridged by this and a return to the first operating state can be effected. A more robust system is thus provided.

In a further embodiment, the return of the driving function to the first computer unit is limited to specified driving functions and/or specified malfunctions of the first computer unit. Serious malfunctions of the first computer unit, with which the risk of a repeat failure of the first computer unit is relatively high or there is still uncertainty about the correct operation of the first computer unit, can be excluded by this. In addition, using said measure the handback of control to the first computer unit, which is correctly operating again, can be limited to driving functions that are less critical in relation to a failure of the first computer unit. The safety of the system is also increased as a result. The specified driving functions or malfunctions are stored in a memory of the first and/or second computer units.

BRIEF DESCRIPTION OF THE DRAWINGS

Exemplary embodiments of the disclosure are presented in the drawings an are explained in more detail in the description below.

In the drawings.

DETAILED DESCRIPTION

Figure 1:
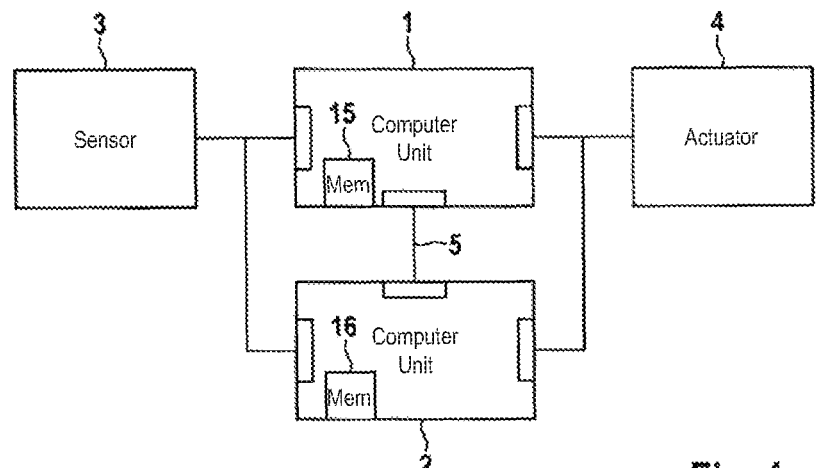
FIG. 1 shows a schematic representation of a first embodiment of the system.

FIG. 1 shows a basic idea of the proposed system. A first computer unit 1 is connected to at least one sensor 3. In addition, the first computer unit 1 is connected to at least one actuator 4. The actuator 4 can be in the form of a single actuator or in the form of a plurality of actuators or in the form of an actuator system. Furthermore, a second computer unit 2 is provided, which is also connected to the at least one sensor 3 and the at least one actuator 4. The sensor can be in the form of one sensor or in the form of a plurality of sensors or in the form of a sensor system. In addition, the first and/or second computer units comprise a data memory 15, 16. Furthermore, the second computer unit 2 is connected by means of an interface 5 to the first computer unit 1. The first computer unit 1 detects the signals of the sensor 3 and according to at least one control method stored in the first data memory 15 determines therefrom a control signal with which the first computer unit 1 activates the actuator 4. In a first operating state, in which the first computer unit 1 is considered to be correctly operational, only the first computer unit 1 can activate the actuator 4. The second computer unit 2 is indeed both connected to the sensor 3 and also to the actuator 4, but cannot activate the actuator 4 in the first operating state. In this case the computer units 1 and 2 are advantageously structurally separate controllers with their own mechanical boundaries having suitable sealing properties.

The first computer unit 1 fulfills for example the following conditions: it comprises a good fault detection means for its own faults. As a result it should be guaranteed that if the first computer unit 1 sends a control signal to the actuator 4 the control signal is also reliable and safe. If the first computer unit cannot supply a safe control signal, then it should not supply a control signal. A classic implementation of said fail-silence function means that the first computer unit does not output a control signal to the actuator 4 in the event of a malfunction. Depending on the selected embodiment, the fail-silence function can also be implemented by a suitable separate fault signal that is transmitted to the actuator 4. With said embodiment, when a fault signal of the first computer unit is input the actuator 4 detects that the control signals of the first computer unit may no longer be carried out. In addition, the first computer unit should have a high availability, i.e. faults and function failures should only occur very seldom.

If a malfunction occurs, i.e. a fault or a functional failure of the first computer unit 1, then the second computer unit 2 takes over the function of the first computer unit 1. For this the second computer unit 2 should fulfill the following requirements for example: the second computer unit 2 should be formed independently of the first computer unit 1, i.e. as a physically unique component. In addition, it would be advantageous if the second computer unit 2 is installed in a dedicated housing and preferably structurally separately and for example at a different location. Furthermore, the second computer unit 2 should be designed to be able to rapidly and seamlessly take over the function of the first computer unit 1 in the event of a fault of the first computer unit 1.

A main path of action runs from the sensor 3 via the first computer unit 1 to the actuator 4. The first computer unit 1 analyzes the sensor signals and calculates therefrom resulting actions, i.e. control signals for the actuator 4, and passes the same to the actuator 4. In one embodiment the second computer unit 2 receives the same sensor data as the first computer unit 1. In a further embodiment the second computer unit 2 can however also receive other or similar sensor data or only a part of the sensor data of the first computer unit 1. In addition, the connection of the second computer unit 2 to the at least one sensor 3 can be similar to the connection of the first computer unit 1. However, a redundant connection, for example via a data bus, can also be used or a redundant connection via a physically separate transmission channel.

Furthermore, the second computer unit 2 preferably receives further information from the first computer unit 1 via the data connection 5, such as for example the control signals that the first computer unit 1 sends to the actuator 3, and/or a fault status of the first computer unit 1 and for example further information, which is described using the following examples. An objective of the data transmission between the first and the second computer units 1, 2 is that the second computer unit 2 can take over the control of the actuator 4 rapidly and as seamlessly as possible in the event of a failure of the first computer unit 1. If a malfunction of the first computer unit 1 occurs, the system changes into a second operating state in which only the second computer unit 2 still sends control signals to the actuator 4 or the actuator 4 accepts and implements control signals from the second computer unit 2. For this the actuator can comprise a dedicated actuator controller or at least an interface that can distinguish between the control signals of the first and the second computer units.

Figure 2:
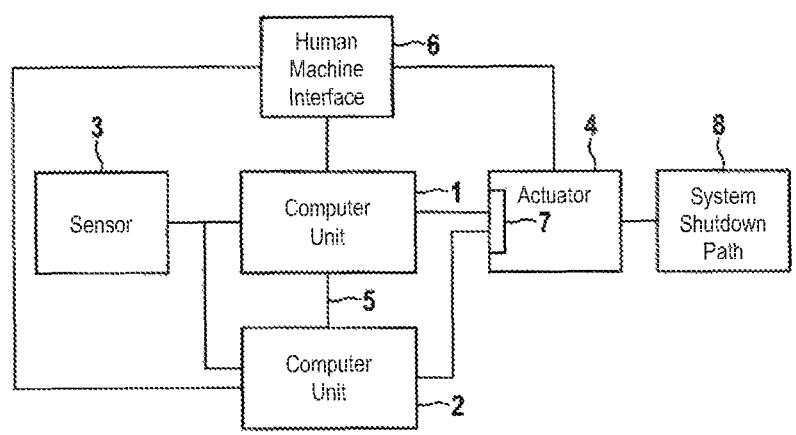
FIGS. 2 to 9 show various partial representations of systems with different embodiments for the use of the computer units with sensors.

FIG. 2 shows a further embodiment of the system, wherein additionally a HMI 6, i.e. an interface between the computer units and a driver of the vehicle, is provided. The HMI 6 constitutes a man/machine interface. The HMI 6 is connected to the first computer unit 1, to the second computer unit 2 and for example to the actuator 4 and can exchange data, information and signals with the same. The HMI can be implemented in the form of suitable sensors for detecting driver inputs, of a display or a voice output and a voice input or a means of haptic signal exchange.

A significant item of information of the system to the driver is a takeover request for a driving function. The takeover request is output from the system to the driver by means of the HMI 6 if the system consisting of the first and the second computer units 1, 2 is performing a driving function, in particular is automating the driving function, i.e. without the influence of the driver, wherein however the system wishes to hand the driving function back to the driver. There can be functional or even fault-related reasons for the handover of the driving function from the system to the driver. A functional reason can for example be that the system is only active on the freeway and outputs a signal to the driver before leaving the freeway, so that the driver takes over the driving function again or realizes that the system can no longer carry out the automated driving function. A fault-related reason can for example be that the system detects an internal fault of the first and/or the second computer unit 1, 2 or of the sensor 3 or of the actuator 4, and therefore the system can only perform a reduced or no driving function at all, in particular no automated driving function. In this case too the driver is requested to take over the driving function or is notified that the system can no longer carry out the driving function.

Furthermore, it is advantageous to inform the driver about the current state of the system. There is a plurality of potentially interesting state information for this. An item of qualitative information consists for example of whether the system is in a fallback level, i.e. in the second operating state, in which the driving function is not performed by the first computer unit 1, but by the second computer unit 2. At the same time said case would result in a request for the driving task by the driver via the HMI. In addition, the information about a fault condition in one of the components, such as for example the sensor system, the computer units 1, 2 or the actuator system is also of interest to the driver. This too can be indicated to the driver by means of the HMI 6. In addition, the boundary conditions under which the system is operating or an automated driving function is being carried out can be indicated to the driver by means of the HMI 6. The boundary conditions can for example be the safety conditions, the roadworthiness or the weather situation. Said information can also be of interest to the driver. In addition, the driver can obtain information about the actuator 4 or the sensor 3 by means of the HMI 6. Furthermore, it can be of interest for the driver to know whether from the viewpoint of the actuator 4 the driver or the system is responsible for the control of the actuator 4.

Further important information for an exchange between the driver and the system consists of the takeover request or the driver takeover. With the takeover request the driver signals to the system via the HMI 6 that he wants to hand to the system the control of at least one specified driving function. With the driver takeover the driver signals to the system that he wants to take over control over the driving function, which is currently being carried out by the system. Said information should be transmitted very simply, wherein the transmission between the driver and the system should be carried out robustly, i.e. in a fail-safe manner.

In a first operating state, in which the system is in particular carrying out a driving function in an automated manner, only the first computer unit 1 sends control signals to an interface 7 of the actuator 4. The first computer unit 1 is designed such that on detecting a malfunction thereof, the first computer unit 1 outputs no further control signals to the interface 7. On detecting a malfunction of the computer unit 1 the system changes to the second operating state, in which only the second computer unit 2 still outputs control signals to the interface 7. Depending on the selected implementation, the return of the driving function to the first computer unit is limited to specified driving functions and/or specified malfunctions of the first computer unit. The specified driving functions and/or malfunctions of the first computer unit are stored in the first and/or second data memories.

In the first operating state a further communication between the second computer unit 2 and the actuator 4 takes place. Said communication should at least ensure that the communications path between the second computer unit 2 and the actuator 4 is operational. Optionally, further functional communications or communications used for test methods are implemented between the second computer unit 2 and the actuator 4 or the interface 7. For example, the actuator 4 can also transmit information about the fault status of the computer unit 1, i.e. the operating state of the computer unit 1, via the interface 7 to the computer unit 2.

In one embodiment, the interface 7 is designed such that the interface 7 selects which input is active, i.e. which computer unit 1, 2 can output control signals to the interface 7. In one embodiment it is provided in the system design that it is interpreted as a fault of the second computer unit 2 if both computer units 1, 2 simultaneously transmit control commands to the interface 7. A further function of the interface 7 consists of the first or second computer unit 1, 2 not deciding which computer unit can output a control signal to the actuator 4, but said decision being made by the interface 7, i.e. on the actuator 4 side. This prevents a malfunction of a computer unit adversely affecting the control commands of the other correctly operating computer unit.

Furthermore, it is advantageous if within the system, i.e. in the HMI 6, in the actuator 4 and in the first and second computer units 1, 2, the information present is consistent as to whether the driver is responsible for the driving function or the first operating state exists, in which the first computer unit 1 is responsible for the driving function, or the second operating state exists, in which the second computer unit 2 has the responsibility for the driving function. If for example the interface 7 detects that there is a malfunction of the first and/or the second computer unit 1, 2, then the interface 7 or the actuator 4 can be designed to pass said information directly to the HMI 6 and thereby to inform the driver or to request the driver to perform a driver takeover. The driver takeover means that the driver is requested to again himself take over the driving function being performed by the system.

Likewise the same form of information consistency assurance about the active level can also be used for the HMI 6. For example, it can be provided that the corresponding information of the driver "I am active" is explicitly forwarded to the further components, such as the computer units 1, 2 and the actuator 3.

In addition, the actuator 4 can be designed to activate a system shutdown path 8 on detecting a malfunction of the first and/or the second computer unit 1, 2. The system shutdown path 8 can be present in various embodiments:

- As a static quantity permanently stored in the actuator 3, for example in a data memory of the actuator 3. An example can be control commands for the actuator for an emergency braking maneuver during straight-ahead travel with a fixed deceleration.
- As a variable quantity with which the control signals for the actuator for the currently valid emergency shutdown are transmitted by the first computer unit in the first operating state or by the second computer unit in the second operating state.
- As a combination of the methods described above, with which only certain parameters of the quantities necessary for the control signals of the actuator are predetermined and the implementation is provided in the actuator 4: for example, a deceleration and a steering angle or a steering angle profile.

In a further embodiment a fault tolerant connection of the actuator 4 is provided. An actuator 4 can be provided in order to control a brake of a vehicle, the steering of a vehicle and/or the propulsion of a vehicle. Safety requirements on said systems are also expected to be different in the context of driver assistance, but it is advantageous if at least part of the actuator itself is fault tolerant against electrical and/or electronic faults: for example, it can be provided to implement the brake by means of an ISP and an electronic brake booster.

Figure 3:
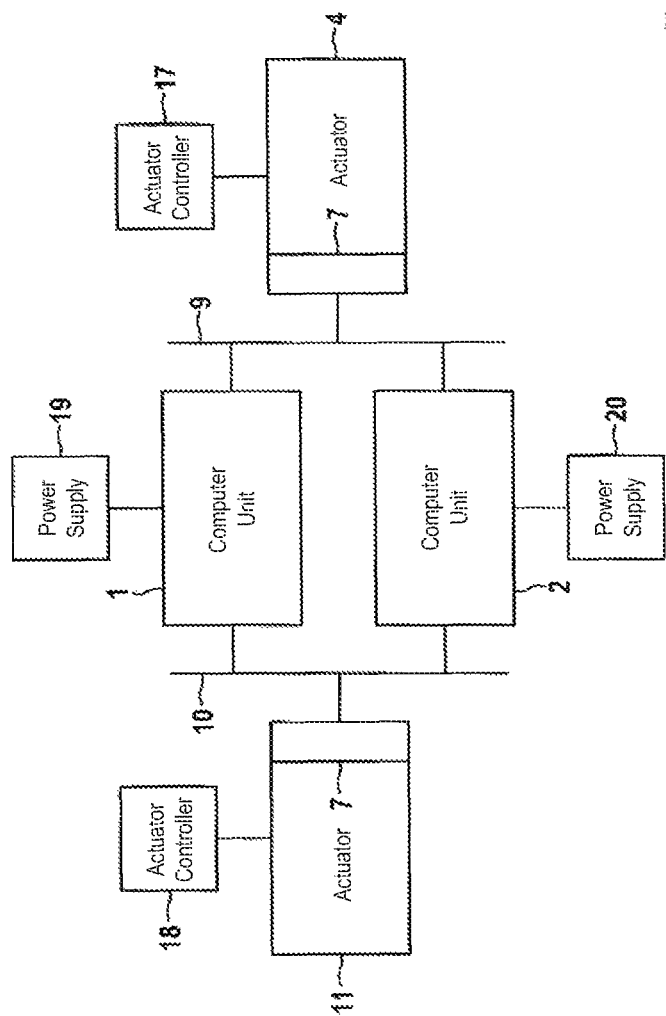

FIG. 3 shows a sub section of a further embodiment of a possible architecture of the system. An actuator 4 comprises at least one actuator controller 17, 18 besides or in addition to the interface 7, or even two actuator controllers 17, 18. The actuator controller 17, 18 can also be integrated within the interface 7. The first computer unit 1 and the second computer unit 2 are connected by means of a first data bus 9 to the first actuator 4 and by means of a second data bus 10 to a second actuator 11. The second actuator 11 can comprise an interface 7 and/or an actuator controller and is for example of identical design to the first actuator 4. Each computer unit 1, 2 can thus output control signals to the first and the second actuators 4, 11. Depending on the selected embodiment, the actuators 4, 11 can be redundantly provided, so that only one of the two actuators 4, 11 is used in the normal case. It is however also possible that in the normal case both actuators can also be used. Said procedure can be used both in the first operating state and also in the second operating state. It is preferably ensured in the system that the information about which of the computer units 1, 2 is active is present in all participating components. Consistent information about the responsibility for the driving function is provided thereby.

In one embodiment, the first computer unit 1 and the second computer unit 2 can be supplied with electrical power by different electrical power supply systems, 19, 20 i.e. by different onboard power supplies. Further increased failure safety results therefrom. In the case of an at least two-channel onboard power supply, i.e. with two separate power supply systems 19, 20, this can be implemented for example by one channel supplying the first computer unit 1 and the other channel supplying the second computer unit 2. In addition, it can be provided that the first actuator 4 and the second actuator 11 are also supplied with electrical power by separate power supply systems. Depending on the selected embodiment, other sub systems, such as for example the HMI 6 and/or the sensor 3 or further sensors, can also be supplied with electrical power by separate electrical power supply systems 19, 20. As a result, a further increase in fault tolerance is achieved. Thus a continuously operating channel always remains available in the case of a failure of an onboard power supply channel.

In one embodiment it is provided that the second computer unit 2 does not have the task of monitoring the first computer unit 1 or detecting faults of the first computer unit 1. It is however possible that information of the first computer unit 1 can be used to test the second computer unit 2. For example, the first computer unit 1 can calculate a current driving function and send the computed driving function or even other control signals for the actuator 4 to the second computer unit 2. Said information can be used by the second computer unit 2 to test itself. A test can for example consist of the second computer unit 2 testing whether it would also have calculated the same driving function or whether it considers the driving function computed by the first computer unit 1 to be valid. The driving function can for example lie within a calculation of a trajectory of motion of the vehicle following a road profile or the driving lane of the vehicle. If the second computer unit 2 gives a negative result during said testing, the second computer unit 2 does not detect a fault in the first computer unit 1 but a fault in itself, and signals said malfunction preferably system-wide, at least to the first computer unit 1 and/or to the HMI 6.

If the detection of the malfunction of the second computer unit 2 takes place during a first operating phase, then as a result a driver takeover for the driving function by the driver is necessary. However, because a functioning first computer unit is always present, it is not mandatory to carry out a rapid takeover of the driving function by the driver. In addition, debouncing of said fault message can be provided, so that a request to take over the driving function is only output to the driver after a plurality of fault messages by the second computer unit 2 about its own malfunction. If however the second computer unit 2 detects a malfunction during a second operating state, then the request to the driver to take over the driving function takes place immediately.

Furthermore, the parallel transmission to the second computer unit 2 of the control signals that the first computer unit 1 transmits to the actuator 4 gives the advantage that the second computer unit 2 has the current control signals of the current driving function available. This enables a highly seamless handover of the driving function from the first computer unit 1 to the second computer unit 2 to be achieved if a malfunction of the first computer unit 1 occurs. For the second computer unit 2 it can be advantageous to detect the previous control signals, in particular previous planning of a driving trajectory of the vehicle, so that a highly seamless continuation of the driving trajectory is possible. This is for example of advantage if the vehicle is currently traversing a turn using a driving function, wherein the driving function is being carried out by the first computer unit 1. This enables a handover of the driving function from the first computer unit 1 to the second computer unit 2 to take place with minimal jerking. Furthermore, it can be advantageous if the first computer unit 1 transmits further information, such as for example a current driving strategy or other internal states of the sensors and/or the actuators and/or of the vehicle.

Figure 4:
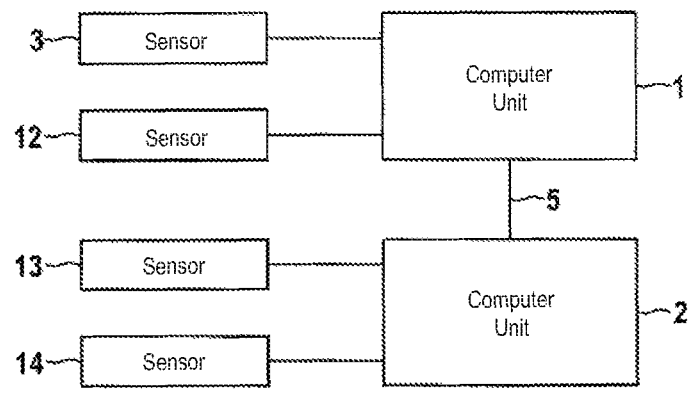

FIG. 4 shows an embodiment for a sub section of the system with the first or second computer unit 1, 2, wherein only the connection to sensors is shown. The connection to further components such as for example the HMI 6 or actuators 4 is not shown here. Said connection corresponds for example to the embodiments of FIG. 1 or 2. The first computer unit 1 is connected to the first sensor 3 and a second sensor 12. The second computer unit 2 is connected to a third sensor 13 and to a fourth sensor 14. Depending on the selected embodiment, each of the sensors can be functionally able by itself to produce a desired measurement signal. There must therefore be no sensor fusion of the first and second sensors or of the third and fourth sensors. Instead of this, in said embodiment in the event of a discrepancy in an analysis of the signals of the redundant sensors a fault in the sensor system is concluded, and the first or the second computer unit signals a corresponding fault to further components of the system, such as for example the HMI 6 and/or the actuator 4. With said embodiment the sensors should fulfill high requirements regarding fault resilience. Each individual sensor should be fully functional regarding safety-relevant analyses, such as for example object detection. Depending on the selected embodiment, each sensor can consist of further sub sensors, so that sensor-internal data fusion of the sensor signal takes place within the sensor. With said embodiment, an averaged sensor signal is transmitted to the corresponding computer unit 1, 2. Furthermore, the redundantly provided sensors 3, 12 or 13, 14 should be very independent in relation to their fault behavior. Preferably, the redundant sensors are based on different sensor principles. As a result, increased fault detection in each channel can be achieved and independence of the sensor channels can be enabled. Highly diverse sensor principles and sensor analyses, such as for example stereo-video sensors, mono-video sensors, Lidar sensors, radar sensors, ultrasonic sensors, capacitive sensors and various frequencies and so on are preferred.

Figure 5:
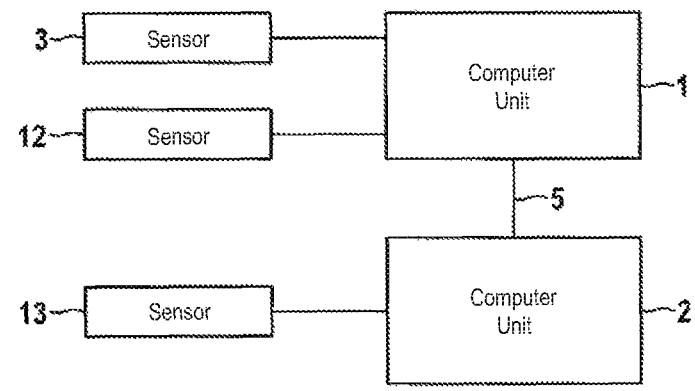

FIG. 5 shows a sub section of the system, wherein only the connection of the first or second computer unit 1, 2 to sensors is shown. The connection to further components, such as for example the HMI 6 or actuators 4 is not shown here. Said connection corresponds for example to the embodiments of FIG. 1 or 2. In this embodiment, only three sensors 3, 12, 13 are provided. The computer unit 1 is connected to the first sensor 3 and the second sensor 12. The second computer unit 2 is connected to the third sensor 13. Said embodiment is technically simpler and less expensive, wherein however the second computer unit 2 can no longer carry out online fault detection of the sensor signal. Recourse can be made to data of the first and/or of the second sensor 3, 12 for plausibility checking or testing the third sensor 13 in normal operation or in the first operating state. Said data are transmitted from the first computer unit 1 to the second computer unit 2. As already described in the example of FIG. 4, the first sensor 3 is preferably fully functional and independent of the second sensor 12. In addition, it can be provided that the third sensor 13 is also fully functional and is designed independently of the first and second sensors 3, 12.

Figure 6:
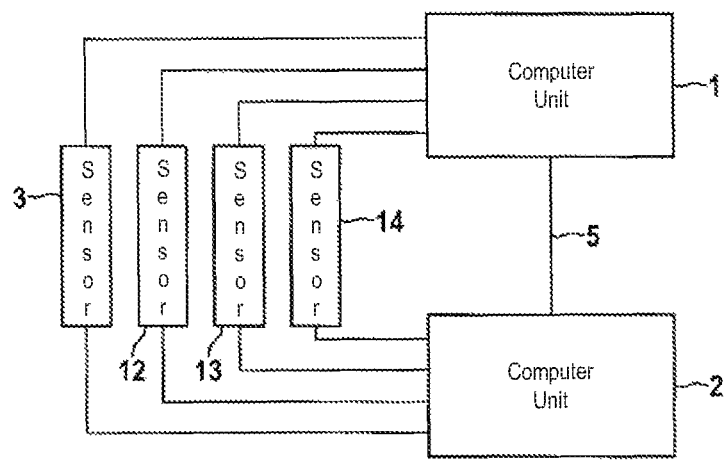

FIG. 6 shows a further embodiment for the connection of the first or second computer unit 1, 2 to four sensors 3, 12, 13, 14. The connection to further components, such as for example the HMI 6 or actuators 4, is not shown here. Said connection corresponds for example to the embodiments of FIG. 1 or 2. With this embodiment each computer unit 1, 2 is connected to each of the sensors 3, 12, 13, 14. With said embodiment fusion of the sensor signals can take place in the computer unit 1, 2. In addition, it is not necessary in said embodiment that each sensor is fully functional by itself. It is sufficient if at least two sensors together can perform the desired measurement.

Figure 7:
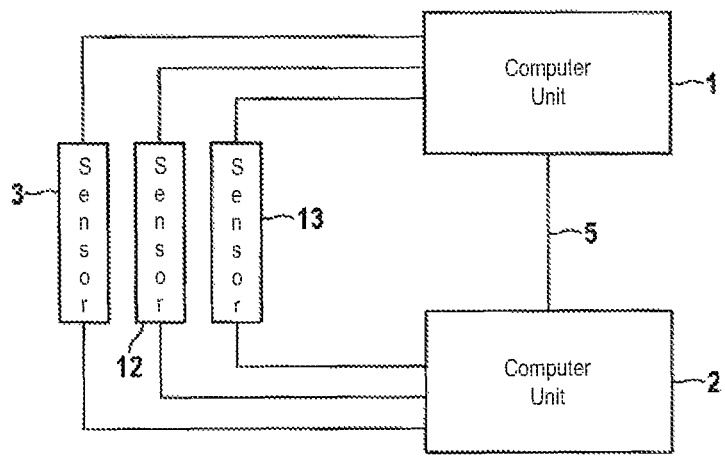

FIG. 7 shows a similar embodiment to FIG. 6, wherein however instead of four sensors only three sensors are provided. The embodiments shown in FIGS. 6 and 7 are fault tolerant against sensor faults.

Figure 8:
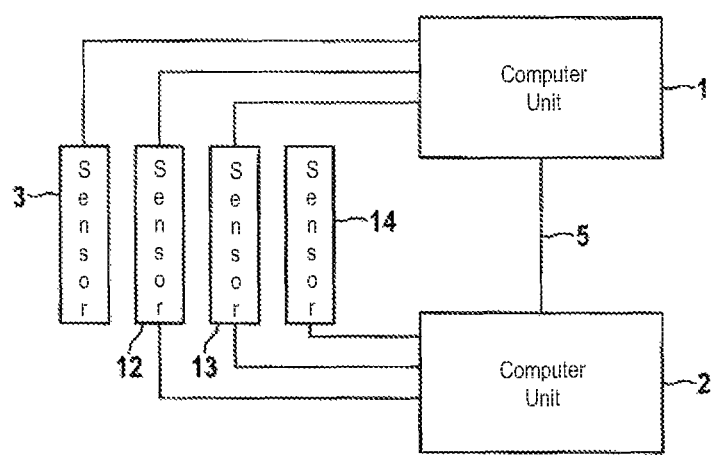

FIG. 8 shows a further embodiment for the connection of the first or second computer unit to four sensors 3, 12, 13, 14. In said embodiment the first computer unit 1 is connected to the first, the second and the third sensors 3, 12, 13. The second computer unit 2 is connected to the second, third and fourth sensors 12, 13, 14. With said embodiment, better fault detection in the event of a failure of one of the sensors is possible because the first computer unit 1 only accesses the first sensor 3 independently of the second computer unit 2 and the second computer unit 2 only accesses the fourth sensor 14 independently of the first computer unit 1.

Figure 9:
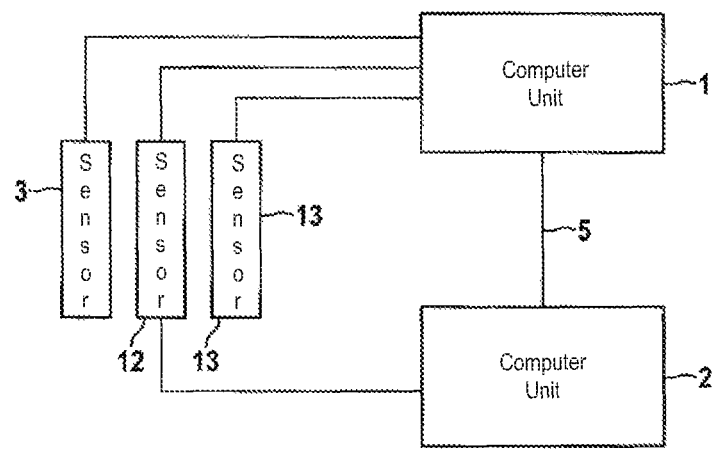

FIG. 9 also shows a connection of the first or second computer unit 1, 2, with which increased fault independence in relation to the failure of a sensor is indicated. With said embodiment the first computer unit 1 is connected to the first, second and third sensors 3, 12, 13. The second computer unit 2 is only connected to the second sensor 12.

Test of the Fallback Level

Test methods advantageously run constantly on the second computer unit 2 during normal operation of the system. Said test methods test the sensors connected to the second computer unit 2 and also the generation of the control signals by the second computer unit 2 for example. Suitable control circuits can be provided for this. Advantageously, the test methods are designed such that they can be interrupted in a short time if the first computer unit 1 signals a malfunction. Depending on the selected embodiment, the performance of the test method can consume 50% or more of the computing power of the second computer unit. A high coverage level is to be shown for the second computer unit. It can therefore be advantageous to carry out very extensive test processes, which can also be time intensive. In addition, as already described above, data of the first computer unit 1 can be used for performing the test method.

Handover Protocol

In the event of a handover of the control over a driving function of the vehicle from the driver to the system with the first or second computer unit 1, 2, for example a takeover request is transmitted by means of the HMI 6 to the first computer unit 1 and to the second computer unit 2. The transmission can be carried out by means of the same or two different communications channels. The corresponding communications channels can be designed as in FIG. 1 or 2. After receiving the handover request, the first and the second computer units 1, 2 check their status and their operability, for example depending on the operating state of the vehicle or the operating location of the vehicle. For example, it can be provided that the performance of a driving function, in particular the automated performance of a driving function, only functions in a specified operating state of the vehicle or in a specified geographic region, such as for example a freeway. Thus before the takeover by the first and the second computer unit a check is made as to whether the first and the second computer units can currently perform the specified driving function for the takeover at all. The first and the second computer units cannot perform the driving function if at least one of the two computer units has a malfunction. Only if both computer units 1, 2 can perform the driving function specified for the handover correctly should a takeover by the two computer units be carried out.

In one embodiment, after receiving the takeover request by the HMI 6 the two computer units 1, 2 first exchange the corresponding status regarding a malfunction and their operability.

Then the first computer unit 1 transmits an Ok for the takeover of the driving function to the driver, for example by means of the HMI, if the first computer unit considers itself to be without errors and to be capable of performing the driving function and has also received the information from the second computer unit that the second computer unit is also without errors and can perform the driving function. In the same way the second computer unit transmits an Ok for the takeover of the driving function to the driver, for example by means of the HMI 6, if the second computer unit considers itself to be without errors and to be capable of performing the driving function and if the second computer unit has received from the first computer unit the information that the first computer unit is without errors and can perform the driving function. After receiving the Ok information from the first and the second computer units 1,2, for example the HMI 6 sends a corresponding activation confirmation to the first computer unit 1 and possibly to further parts of the system, such as for example the second computer unit 2, the actuators 4 and/or the sensors 3.

Handback

In one embodiment the proposed architecture enables a change from the second operating phase, in which the driving function is performed by the second computer unit 2, into the first operating phase. If during the second operating phase the first computer unit 1 determines that it is again operating without errors and can perform the driving function, then it can take over control of the driving function again by means of a corresponding handback procedure. This can for example be advantageous if the fault in the first computer unit 1 was only temporary or if the fault was caused by gaps, for example in the sensors 3, that have disappeared again in a different road situation.

The handback can comprise the following steps:

In one embodiment a classification of the faults can be provided, in the event of whose occurrence in the first computer unit 1 a return to the first operating state is possible. Corresponding tables for this with the faults can be stored in a data memory, for example in the second computer unit 2. When using the classification, a handback is only possible with a fault that is approved for the transition to the first operating phase. Depending on the selected embodiment, a type of fault can also be specified in the classification, with whose occurrence in the first computer unit 1 a return from the second operating phase to the first operating phase is possible. In addition, an information exchange between the first and second computer units 1, 2 can be provided in order to exchange the fault with which a handback is possible.

In addition, a handback check of the first computer unit 1 can be provided. During said check, for example, a complete reset of the first computer unit 1 and performing all initialization tests can be provided.

Likewise, special test methods can be stored that are provided for investigating the error types that have occurred. Furthermore, signaling from the first computer unit 1 to the second computer unit 2 and to the HMI 6, and preferably to the actuator 3, can be provided, with which it is indicated that the first computer unit 1 is operational again.

In addition, it can be provided that the second computer unit 2 transmits information to the first computer unit 1, which functionally enables a seamless takeover of the driving function by the first computer unit 1. Said information can for example correspond to the information from the first computer unit 1 to the second computer unit 2 in the first operating phase. As a result of the handback method proposed here, it is possible to request a driver takeover in the event of a fault of the first computer unit 1 not urgently, but with predetermined, preferably long time constants. If the second computer unit 2 is actually highly independent of the first computer unit 1 in relation to the functional fault effects, continued operation by the second computer unit 2 can well lie in the range of minutes. There is thus sufficient time for a possible handback or a transition from the second operating phase into the first operating phase. If the first computer unit 1 has successfully achieved a transition from the second operating phase to the first operating phase, there is then a redundant, correctly operating system again, which can continue to operate unrestricted—within the context of the functional limitations. Under this assumption it is also not absolutely necessary to inform the driver within a very short time after the occurrence of the fault.

Depending on the selected embodiment, operation in the second operating phase can be restricted in comparison to operation in the first operating phase. For example, in the second operating phase lower speeds, larger spacings, no overtaking maneuvers or the preference for a predetermined driving lane, in Germany the right driving lane on a multi-lane road, are selected for safety, so that in the event of an additional failure of the second computer unit 2 the potential danger is reduced and the driver has more time for a sudden takeover of the driving function. If the second computer unit should have a malfunction in the second operating state, then a corresponding indication to the driver is necessary, for example by means of the HMI. With said display the driver is requested to immediately take over the automated driving function again himself.

What is claimed is:

1. A system comprising:
a first computer unit having a first interface configured to connect to a sensor and to an actuator;
a second computer unit having a second interface configured to connect to the sensor and to the actuator;
a third interface configured to connect the first computer unit and the second computer unit to each other; and
a human-machine interface configured to transfer a handover request for performance of an automated driving function by means of separate interfaces to the first computer unit and the second computer unit, the first computer unit and the second computer unit being configured to mutually and separately indicate a takeover of the automated driving function to the human-machine interface, the human-machine interface being configured to only transfer the automated driving function to the first computer unit if each of the first computer unit and the second computer unit indicate that they are operating correctly and can perform the automated driving function,
wherein at least one of the first computer unit, the second computer unit, and the actuator are configured to control which of the first computer unit and the second computer unit can effectively activate the actuator.

2. The system as claimed in claim 1, wherein the actuator has a fourth interface, the fourth interface being configured to control, based on one of a first operating state and a second operating state, whether a control command for a driving function from one of the first computer unit and the second computer unit is adopted, such that in the first operating state only the first computer unit can activate the actuator and in the second operating state only the second computer unit can activate the actuator.

3. The system as claimed in claim 1, wherein:
during correct operation of the first computer unit, a first operating state is active and only the first computer unit can effectively activate the actuator; and
in the event of a malfunction of the first computer unit, a second operating state is active and only the second computer unit can effectively activate the actuator.

4. The system as claimed in claim 1, wherein, in a first operating state, the second computer unit is configured to perform a test method.

5. The system as claimed in claim 4, wherein the test method tests a communication between the second computer unit and the first computer unit.

6. The system as claimed in claim 4, wherein the test method tests a communication between the second computer unit and the actuator.

7. The system as claimed in claim 4, wherein the test method checks an operation of the second computer unit.

8. The system as claimed in claim 1, wherein the actuator is configured to, in the response to a malfunction of at least one of the first computer unit and the second computer unit, operate in one of a safety function and a safety position.

9. The system as claimed in claim 1, further comprising:
two actuator controllers, the two actuator controllers being configured to work in conjunction with the actuator, each actuator controller being connected to the first computer unit and the second computer unit.

10. The system as claimed in claim 1, wherein the first computer unit and the second computer unit are configured to be supplied with electrical power from separate electrical power supply systems.

11. The system as claimed in claim 1, wherein the first computer unit is configured to provide at least input data to the second computer unit for a test method for checking for correct operation.

12. The system as claimed in claim 1, wherein:
the first computer unit is configured to (i) compute a first automated driving function and (ii) transmit the computed first automated driving function to the second computer unit; and
the second computer unit is configured to (i) independently compute a second automated driving function that is the same as the first automated driving function (ii) compare the independently computed second automated driving function with the first automated driving function, and (iii) check for a malfunction of the second computer unit based on the comparison.

13. The system as claimed in claim 1, further comprising:
at least a first sensor and a second sensor configured to redundantly measure a same parameter, the first computer unit being connected to the first sensor and the second computer unit being connected to the second sensor.

14. The system as claimed in claim 13, further comprising:
a plurality of sensors, the first computer unit and the second computer unit each being connected to an overlapping set of the plurality of sensors, each sensor of the plurality of sensors being connected at least one of the first computer unit and the second computer unit.

15. The system as claimed in claim 1, wherein:
the first computer unit is configured to send a takeover to the human-machine interface if (i) the first computer unit assesses itself to be operational and (ii) the first computer unit has received from the second computer unit an indication that the second computer unit also assesses itself to be operational; and
the second computer unit is configured to send a takeover to the human-machine interface if (i) the second computer unit assesses itself to be operational and (ii) the second computer unit receives from the first computer unit an indication that the first computer unit also assesses itself to be operational.

16. The system as claimed in claim 1, wherein, in a second operating state in which the second computer unit is performing an automated driving function, the performance of the automated driving function is handed back to the first computer unit if the first computer unit indicates that it is operational again.

17. The system as claimed in claim 16, wherein the handing back of the automated driving function to the first computer unit is limited to at least one of specified malfunctions and specified driving functions.

18. A method for the operation of a system having a first computer unit and a second computer unit, the first computer unit having an first interface configured to connect to a sensor and to an actuator the second computer unit having an second interface configured to connect to the sensor and to the actuator, the system further having a third interface configured to connect the first computer unit and the second computer unit to each other, the system further having a human-machine interface, the method comprising:

controlling, with at least one of the first computer unit, the second computer unit, and the actuator, which of the first computer unit and the second computer unit can effectively activate the actuator; and transferring, with the human-machine interface, a handover request for performance of an automated driving function by means of separate interfaces to the first computer unit and the second computer unit, the first computer unit and the second computer unit being configured to mutually and separately indicate a takeover of the automated driving function to the human-machine interface, the human-machine interface being configured to only transfer the automated driving function to the first computer unit if each of first computer unit and the second computer unit indicate that they are operating correctly and can perform the automated driving function.

19. A system comprising:

a first computer unit having a first interface configured to connect to a sensor and to an actuator, ;

a second computer unit having a second interface configured to connect to the sensor and to the actuator; and a third interface configured to connect the first computer unit and the second computer unit to each other, wherein at least one of the first computer unit, the second computer unit, and the actuator are configured to control which of the first computer unit and the second computer unit can effectively activate the actuator, wherein the first computer unit is configured to (i) compute a first automated driving function and (ii) transmit the computed first automated driving function to the second computer unit, and the second computer unit is configured to (i) independently compute a second automated driving function that is the same as the first automated driving function, (ii) compare the independently computed second automated driving function with the first automated driving function, and (iii) check for a malfunction of the second computer unit based on the comparison.

* * * * *

UNITED STATES PATENT AND TRADEMARK OFFICE
CERTIFICATE OF CORRECTION

PATENT NO. : 9,606,537 B2
APPLICATION NO. : 14/880510
DATED : March 28, 2017
INVENTOR(S) : Thomas Hogenmueller Page 1 of 1

It is certified that error appears in the above-identified patent and that said Letters Patent is hereby corrected as shown below:

In the Claims

In Column 16, Lines 16-18 of Claim 19 should read:
wherein the second computer unit is configured to (i) independently compute a second automated driving function that is the same as the first automated driving function, Signed and Sealed this
Sixth Day of June, 2017

Michelle K. Lee
*Director of the United States Patent and Trademark Office*